(12) United States Patent
Grbavac et al.

(10) Patent No.: US 9,754,223 B2
(45) Date of Patent: Sep. 5, 2017

(54) METHODS AND SYSTEMS FOR GENERATING AND VALIDATING ELECTRONIC TICKETS

(71) Applicants: Josip Grbavac, Mostar (BA); Peter Mantock, Middx (GB)

(72) Inventors: Josip Grbavac, Mostar (BA); Peter Mantock, Middx (GB)

(*) Notice: Subject to any disclaimer, the term of this patent is extended or adjusted under 35 U.S.C. 154(b) by 451 days.

(21) Appl. No.: 14/591,905

(22) Filed: Jan. 7, 2015

(65) Prior Publication Data
US 2015/0193702 A1 Jul. 9, 2015

Related U.S. Application Data

(60) Provisional application No. 61/925,610, filed on Jan. 9, 2014.

(51) Int. Cl.
*H04L 29/06* (2006.01)
*G06Q 10/02* (2012.01)
*H04W 12/06* (2009.01)

(52) U.S. Cl.
CPC ......... *G06Q 10/02* (2013.01); *H04L 63/0428* (2013.01); *H04W 12/06* (2013.01); *G06Q 2220/10* (2013.01)

(58) Field of Classification Search
CPC .... H04W 12/06; H04L 63/0428; G06Q 10/02
See application file for complete search history.

(56) References Cited

U.S. PATENT DOCUMENTS

| | | | | |
|---|---|---|---|---|
| 2003/0066883 A1* | 4/2003 | Yu | ......................... | G06K 7/1095 235/382 |
| 2007/0060320 A1* | 3/2007 | Kelly | ...................... | G07F 17/32 463/27 |
| 2008/0002654 A1* | 1/2008 | Bolin | ...................... | H04H 60/16 370/339 |
| 2010/0042546 A1* | 2/2010 | Humbel | .................. | G06Q 10/02 705/64 |
| 2010/0131530 A1* | 5/2010 | Gibson | ............... | G06F 17/3087 707/758 |
| 2011/0213700 A1* | 9/2011 | Sant—Anselmo | .... | G06Q 10/10 705/39 |
| 2012/0039469 A1* | 2/2012 | Mueller | .................. | G06Q 20/12 380/252 |
| 2012/0296826 A1* | 11/2012 | Bergdale | ............ | G06Q 20/0457 705/65 |
| 2014/0180850 A1* | 6/2014 | Ackley | .................. | G06Q 20/40 705/16 |

* cited by examiner

*Primary Examiner* — Dao Ho

(57) ABSTRACT

Methods and systems for generating and validating electronic tickets are disclosed. The systems include a server that is configured to host a centralized website through which a computer application may be downloaded into a plurality of user devices. The server is further configured to issue electronic tickets to the user devices that have downloaded the computer application; embed an encrypted visual identifier that is unique to an event in each electronic ticket; generate instructions to be issued to an event administrator that identifies a decrypted form of the visual identifier for each event; and include instructions within each electronic ticket that may be executed by an event administrator to convert the encrypted visual identifier that is shown in the electronic ticket of each user device into the decrypted form of the visual identifier.

4 Claims, 6 Drawing Sheets

METHODS AND SYSTEMS FOR GENERATING AND VALIDATING ELECTRONIC TICKETS

CROSS-REFERENCE TO RELATED APPLICATIONS

This application is a non-provisional application of, and incorporates by reference, U.S. provisional patent application Ser. No. 61/925,610, filed Jan. 9, 2014.

FIELD OF THE INVENTION

The field of the present invention relates to methods and systems for generating and validating electronic tickets, particularly tickets for entertainment-oriented events.

BACKGROUND OF THE INVENTION

Most entertainment-oriented events will limit attendance to ticket holders. Non-limiting examples of such events include concerts, theatrical performances, cinematic performances, sporting events, and night club-related events. Indeed, for more than a century, the venues that host or sponsor such events will sell and distribute a limited number of tickets (with such number often being dependent upon the event capacity), which permits a ticket purchaser to attend a specified event. Historically, and for some events still today, such tickets comprise a small piece of paper or cardstock, which specifies the event for which the ticket may be redeemed. At the event, a gatekeeper/doorperson will often collect such tickets before a person is permitted to enter the event—who will also verify that the ticket appears valid and authentic for the applicable event.

In recent years, the process of generating, distributing, and validating event tickets has adopted modern forms of technology. For example, many event venues will allow prospective attendees to purchase a ticket through a website, and then download and/or print the purchased ticket from the website. These electronically purchased tickets will typically exhibit many of the same features as traditional/paper tickets, such as information that conveys the identity and date/time of the applicable event, sometimes the identity of the purchaser, and other information. Still further, these electronic tickets will sometimes include a means for the event venue to authenticate the validity of the ticket. For example, the electronically purchased ticket may comprise a barcode or other validating means, which the venue doorperson may scan or review to assess whether the ticket is authentic and valid.

Despite the existence of these improved methods of generating, distributing, and validating electronic tickets, a demand continues to exist for new and improved methods of generating, distributing, and validating electronic tickets. More particularly, a demand exists for methods and systems that: (1) allow an event/venue administrator to sell and distribute electronic tickets through a variety of on-line platforms; (2) allow an event/venue administrator to include validating information in each electronic ticket that is unique to the applicable event; (3) create electronic tickets that are less susceptible to counterfeiting and include more robust means of validating the authenticity of an electronic ticket; and, importantly, (4) allow an event/venue administrator to validate the authenticity of each electronic ticket without the aid of additional machines or validation devices (at the point of event entry). With respect to this last element, it would be particularly desirable to provide ticket validation methods and systems that do not require an event doorperson to use, for example, barcode scanners, UV light readers, or other devices that are often required to validate an electronic ticket.

As the following will demonstrate, the subject invention addresses the foregoing demands (and many others).

SUMMARY OF THE INVENTION

According to certain aspects of the present invention, new and improved systems are provided for generating, distributing, and validating electronic tickets for an event. In general, the systems of the present invention: (1) allow users to purchase electronic tickets to an event, with the tickets being issued (e.g., via SMS communications) to their personal mobile devices; (2) embed an encrypted visual identifier in each electronic ticket that is specific for the applicable event; (3) inform the event administrator of how the encrypted visual identifier may be decrypted in each user's (prospective attendee's) device, e.g., by having the event doorperson enter a defined PIN into each user's device; and (4) provide the event administrator, in advance of the event, with a copy of the decrypted form of the encrypted visual identifier (so that the event doorperson, e.g., using the assigned PIN, will be able to decrypt and validate the electronic tickets at the event entrance on the day of the event).

More specifically, the systems of the present invention will include at least one server that is configured to host a centralized website through which a computer application may be downloaded into a plurality of user devices. The invention provides that the server is configured to issue electronic tickets to user devices that have downloaded the computer application (when such users purchase the tickets for an event), with each electronic ticket being subsequently stored within each user's device. The server is further configured to include an encrypted visual identifier that is unique to an event in each electronic ticket that is stored within each user's device. The invention provides that the server will further be configured to generate instructions that are issued to an event administrator, which identify a decrypted form of the visual identifier for each event. Each electronic ticket will also include instructions that may be executed by an event administrator (or its delegated doorperson) to convert the encrypted visual identifier that is shown in the electronic ticket of each user device into the decrypted form of the visual identifier (e.g., the system may provide the event administrator with a unique PIN that an event doorperson may enter into each user's (ticket holder's) device, which will convert the encrypted visual identifier into its decrypted form).

The invention provides that the server is configured to, optionally, permit the encrypted visual identifier that is shown in each electronic ticket of each user device to be converted into the decrypted form only during a prescribed period of time. More particularly, the prescribed period of time during which the encrypted visual identifier that is shown in each electronic ticket may be converted into the decrypted form may consist of date and time coordinates that are specified by the event administrator through the centralized website, e.g., the hours just prior to (and during) a scheduled event (e.g., two hours prior to the event). According to such aspects of the present invention, the decrypted form of the visual identifier will preferably consist of a visual symbol (or set of symbols), which may be viewed within a graphical user interface of each user device. In certain embodiments, the decrypted form of the visual identifier may be represented by certain letters, numbers, or a combination of letters and numbers.

As explained further below, because the event administrator will know what visual symbol (or set of symbols) to look for in a decrypted form of an electronic ticket, the event administrator (or his/her delegate) will be able to admit only persons who carry an electronic ticket that shows a decrypted visual identifier (visual symbol, including a specific letter/number combination) that matches that which was previously communicated to the event administrator by the system server. In addition, the instructions that identify the decrypted form of the visual identifier (which are provided to the event administrator) will further include a description of a set of actions that an event administrator must perform with each user device, in order to convert the encrypted visual identifier into the decrypted form. More particularly, the set of actions may comprise: (i) a touch pattern to apply to a touch screen of each user device; (ii) a numeric code (a PIN number) to enter into a keypad included within each user device; or (iii) a method for holding and orienting each user device which is detected by an accelerometer included within each user device. The invention provides that after an electronic ticket has been redeemed (and validated by an event administrator), the server may further be configured to incorporate a third visual identifier within the redeemed electronic tickets, in order to indicate that the ticket has been redeemed and may no longer be used.

The invention provides that the server is further configured to receive, and store within a database, ticket issuance and validation data. The ticket issuance and validation data may include (i) a number of electronic tickets that have been issued for an event; (ii) an identifier (e.g., name, email address, telephone number, username, etc.) that is correlated to each user who has been issued an electronic ticket for an event; (iii) a number of users who have redeemed electronic tickets for an event at any given time; (iv) an identifier that is correlated to each user who has redeemed an electronic ticket for an event at any given time; or (v) combinations of the foregoing.

The above-mentioned and additional features of the present invention are further illustrated in the Detailed Description contained herein.

DETAILED DESCRIPTION OF THE INVENTION

Figure 1:
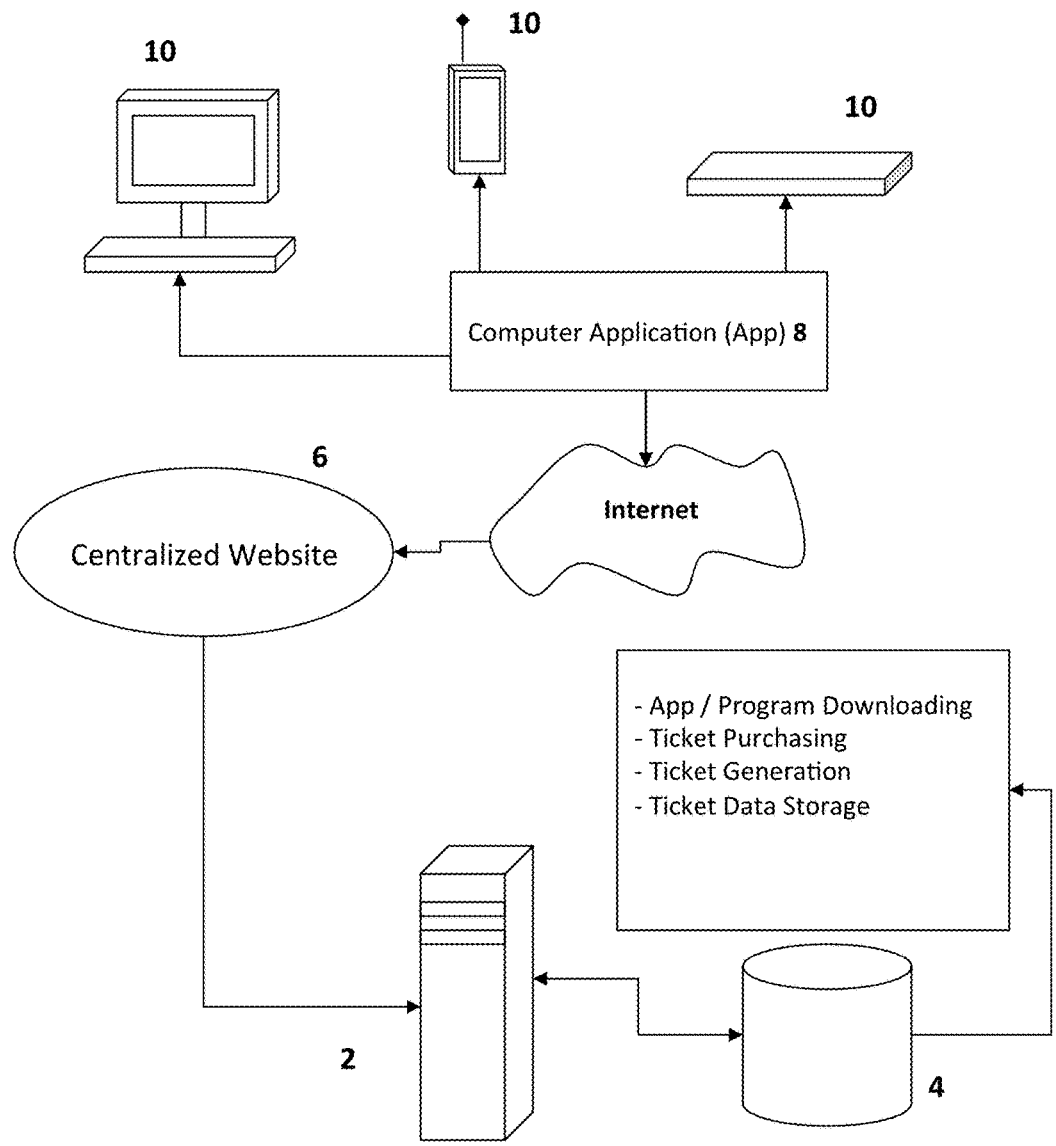
FIG. 1 is a diagram that illustrates certain components of the systems described herein.

The following will describe, in detail, several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

According to certain preferred embodiments of the present invention, systems are provided for generating, distributing, and validating electronic tickets for an event. The invention provides that the "event" may be any of a plurality of entertainment-oriented activities, such as concerts, theatrical performances, cinematic performances, sporting events, and night club-related events. Referring now to FIGS. 1-6, the systems generally include at least one server 2 that houses or communicates with at least one database 4. The invention provides that the server 2 may comprise a single server or a group of servers. More particularly, the invention provides that the system may employ the use of cloud computing, whereby the server paradigm that is utilized to support the system of the present invention is scalable and may involve the use of different servers (and a variable number of servers) at any given time, depending on the amount of users who are utilizing the system at different time points.

The server 2 is configured to host a centralized website 6 through which a computer application 8 may be downloaded into a plurality of user devices 10. The invention provides that the website 6 may be accessed, and the computer application 8 downloaded, using any device 10 that is capable of establishing an Internet connection, such as personal desktop computers, tablet computers, telephones (including smart phones, PDAs, etc.), and other devices. According to the preferred embodiments of the present invention, however, the user devices 10 that receive the computer application 8 will be a mobile device, such as a smart phone, so that the electronic tickets described herein may be easily transported to a particular event and presented for admission. The invention provides that the electronic tickets may be purchased by consumers within the centralized website 6 and/or through the computer application 8 within a device 10. At the time of purchase, the purchaser may be required to login into the website 8 (or register a new account with the website 8), such that the server 2/database 4 will be provided with the purchaser's contact information, including his/her email address, mobile phone number, and/or IMEI Number (International Mobile Equipment Identity Number).

Following the purchase of an event ticket, the invention provides that the electronic ticket will be issued 12 (by the server 2) to the purchaser (user) devices 10 via short message service (SMS) communications, electronic mail, or download through a website—with the electronic tickets being issued using a data method that is based on event time and date information. The invention provides that SMS communication will be the preferred mode of issuing the electronic tickets, insofar as such mode will create an automatic audit trail and time stamp for such tickets. The invention provides that the electronic ticket, preferably issued through SMS communication, will be encrypted using, in part, the user's phone number and IMEI number. The electronic ticket will be subsequently stored within the user's device 10 for later use and validation.

Figure 2:
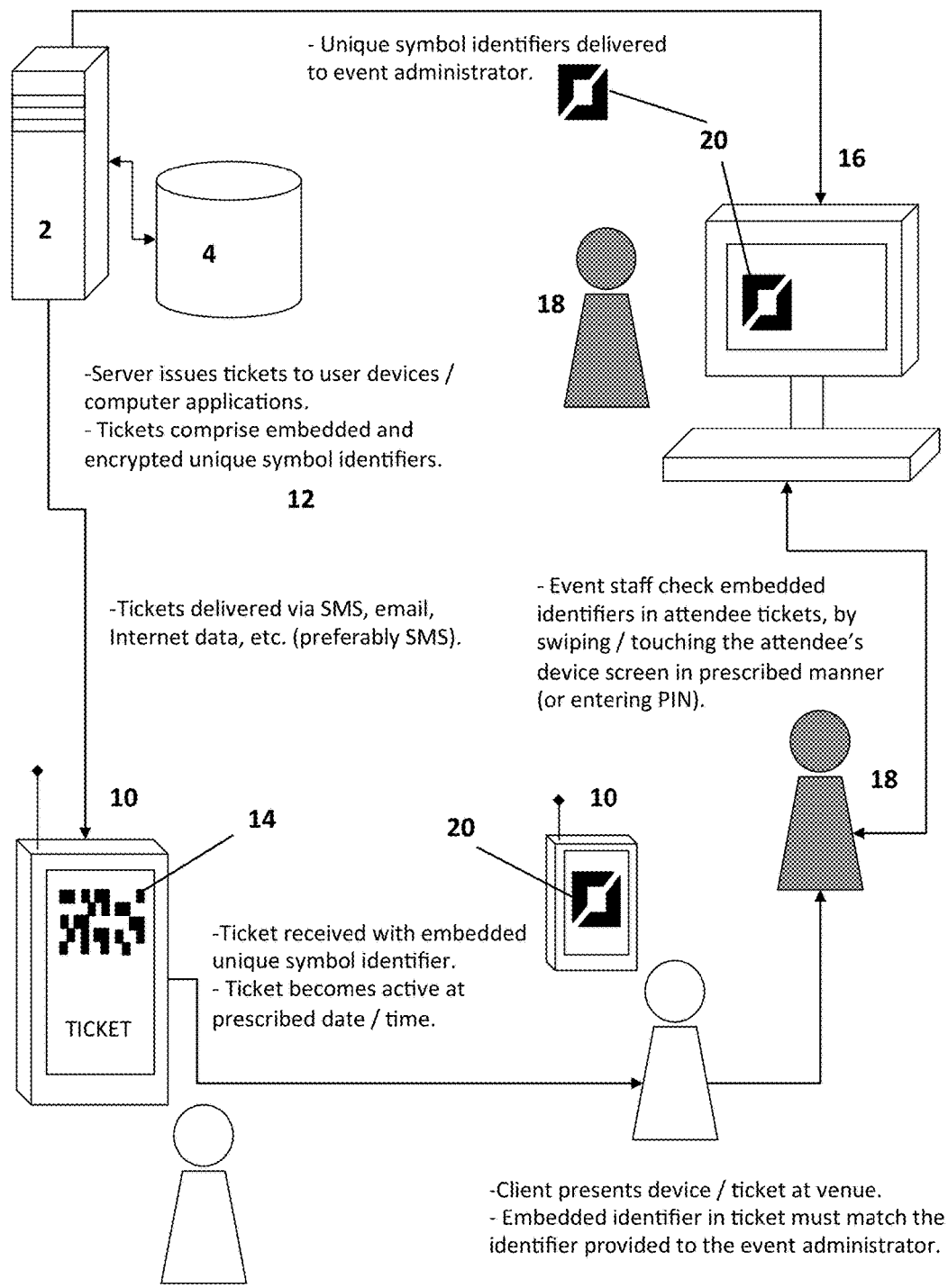
FIG. 2 is a diagram that illustrates the means by which the electronic tickets are issued by the systems described herein, and the means by which event/venue administrators may validate each such ticket.

Referring now to FIG. 2, as explained herein, the invention provides that the electronic ticket issued by the server 2 will contain an encrypted string. The encrypted string, along with the computer application 8 that has been downloaded into the user device 10, will be configured to create an encrypted visual identifier 14 within each electronic ticket that is stored within each user's device 10, with the electronic ticket and encrypted visual identifier 14 being unique to an event (i.e., the event for which the user purchased the electronic ticket). More particularly, the server 2 and computer application 8 will be configured to generate and embed in each electronic ticket that is issued to a user device 10 an encrypted visual identifier 14 that is unique and assigned to a specific event. The correlations between an encrypted visual identifier 14 and a particular event may be stored within and retrieved from the database 4.

Figure 3:
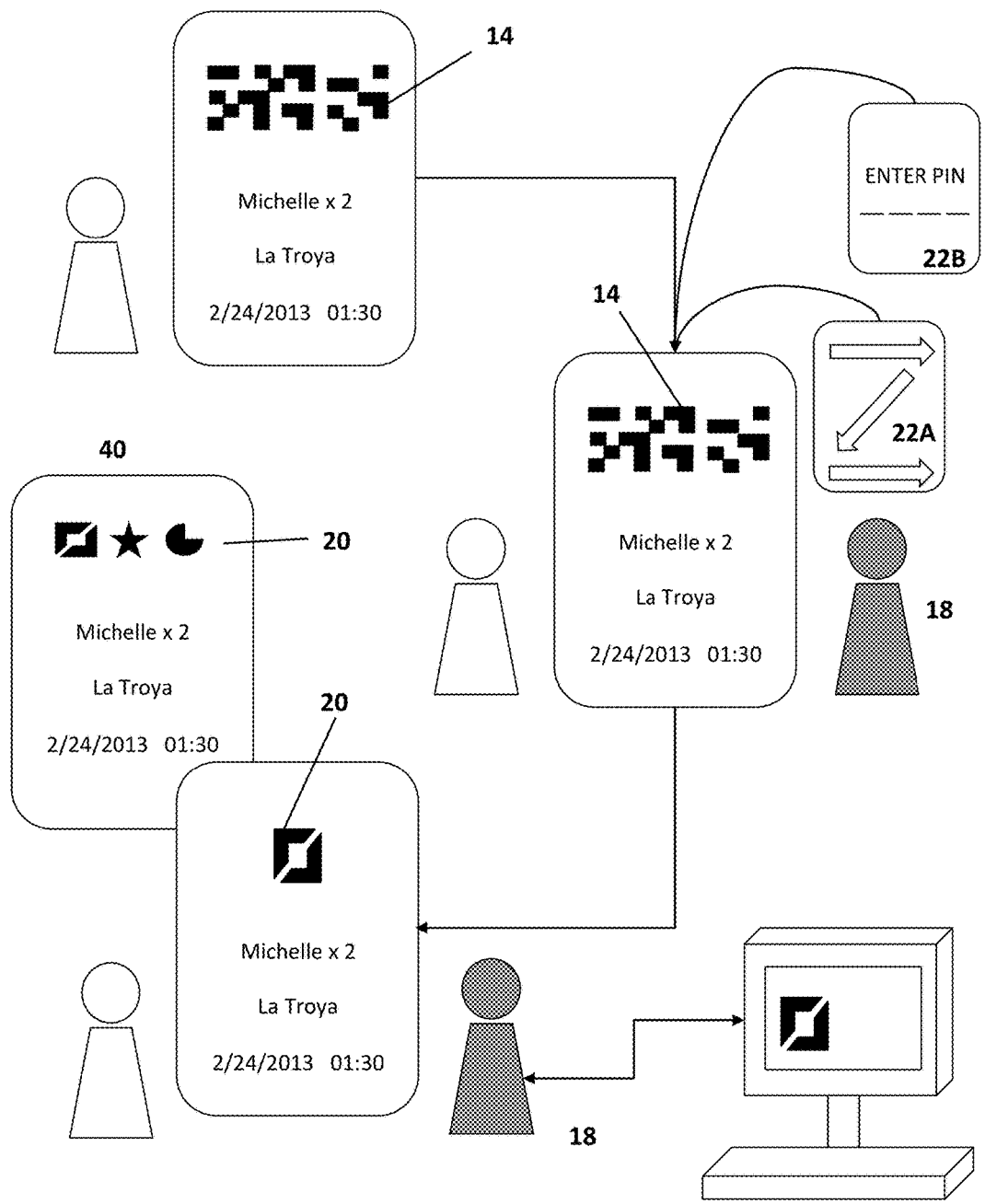
FIG. 3 is a diagram that illustrates a non-limiting example of an encrypted electronic ticket issued by the systems described herein, and the means by which the electronic ticket is decrypted and validated by an event/venue administrator.

The invention provides that the server 2 will further be configured to generate instructions that are issued 16 to an event administrator 18, which identifies a decrypted form 20 of the visual identifier for each event. Similar to the issuance of electronic tickets to user devices 10, the instructions that identify the decrypted form 20 of the visual identifier for each event may be issued 16 to the event administrator 18 through SMS communications, electronic mail, or download through a website. According to such embodiments of the present invention, the decrypted form 20 of the visual identifier will preferably consist of a visual symbol, which may be viewed within a graphical user interface of each user device 10 (i.e., a recognizable visual symbol, character, letter, number, a combination of the foregoing, etc. will appear when the encrypted visual identifier 14 is converted into the decrypted form 20). In other embodiments, the decrypted form 20 of the visual identifier may comprise a series of symbols, numbers, and/or letters, such as three symbols, numbers, and/or letters 40 (FIG. 3). In such case, the series of symbols, numbers, and/or letters may be created by any random combination of the same, selected from a larger group of symbols, numbers, and letters. This way, an event administrator 18 will know what visual symbol(s), number(s), and/or letter(s) to look for during an event, such that the event administrator 18 (or his/her delegated doorperson) will only admit persons who carry an electronic ticket that shows a decrypted visual identifier 20 (which includes any single or series of visual symbols, numbers, and/or letters) that matches that which was previously communicated to the event administrator 18 by the system server 2. As used herein, the terms "visual identifiers" and "visual symbols" include non-numeric symbols, non-alphabetic symbols, numbers, letters, and combinations of the foregoing.

According to certain preferred embodiments, the invention provides that the server 2 is configured to, optionally, permit the encrypted visual identifier 14 that is shown in each electronic ticket of each user device 10 to be converted into the decrypted form 20 of the visual identifier only during a prescribed period of time. More specifically, the prescribed period of time may consist of date and time coordinates that are specified by the event administrator 18 through the centralized website 6, e.g., the hours just prior to (and during) a scheduled event, such as two hours prior to the event. This type of restriction will prevent a ticket holder from accidentally validating an electronic ticket prematurely. In addition, by providing the event administrator 18 with the ability to permit ticket validation only during prescribed times, the event administrator 18 may control when certain groups of attendees will arrive at an event—which can help with crowd control issues at large events.

Referring now to FIG. 3, according to certain preferred embodiments, the invention provides that each electronic ticket may include instructions that may be executed by an event administrator 18 to manually convert the encrypted visual identifier 14 that is shown in the electronic ticket of each user device 10 into the decrypted form 20 of the visual identifier. These instructions may be executed by an event administrator 18 carrying out a set of actions 22 with each user device 10, which will be effective to convert the encrypted visual identifier 14 into the decrypted form 20 (e.g., a description of how a touch screen of each user device 10 must be swiped in order to convert the encrypted visual identifier 14 into the decrypted form 20). More particularly, for example, the set of actions may comprise: (i) a touch pattern to apply to a touch screen of each user device (e.g., the touch pattern may be to swipe the touch screen of a user device 10 with a "Z" pattern 22A); (ii) a numeric code (a PIN) to enter into a keypad included within each user device (22B); or (iii) a method for holding and orienting each user device which is detected by an accelerometer included within each user device. When the event administrator 18 executes such unique actions 22 with a user's device 10, the encrypted visual identifier 14 that is shown in the electronic ticket is converted into the decrypted form 20 (the decrypted form 20 is otherwise hidden from view until the event administrator 18 executes the unique actions 22 (or enters the correct PIN 22B) with a user's device 10 to decrypt the encrypted visual identifier 14). In certain preferred embodiments, the invention provides that the combination of the user's phone number, IMEI number, and the performance of the correct validating actions 22 (e.g., correct PIN entry) will cause the computer application 8 to convert the encrypted visual identifier 14 into the decrypted form 20.

The invention provides that, in certain preferred embodiments, the unique actions 22 applied to each user's device 10 to convert the encrypted visual identifier 14 into the decrypted form 20 will comprise the entry of a PIN number 22B that was previously communicated to the event administrator 18. The use of a PIN number creates less room for user error by the event administrator 18 (or its delegated event doorperson), i.e., the risk for error caused by the doorperson failing to swipe a device 10 touch screen in a precise fashion is eliminated. In addition, the use of PIN numbers to convert the encrypted visual identifier 14 into the decrypted form 20 will, at the option of an event administrator 18, facilitate the issuance and use of multiple valid PINs for a single event, with each PIN being assigned to a different doorperson. In this scenario, each PIN, assigned to each unique doorperson, may optionally be correlated with the same (or different) decrypted forms 20 of the visual identifier (i.e., each doorperson may be looking for the same, or their own assigned and unique, set of symbols when the encrypted visual identifier 14 is converted into the decrypted form 20).

Figure 4:
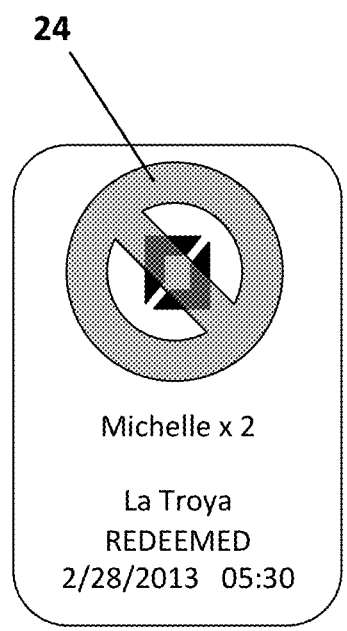
FIG. 4 is a diagram that provides a non-limiting example of a redeemed electronic ticket described herein.

Referring to FIG. 4, the invention provides that after an electronic ticket has been redeemed (and validated by an event administrator 18) using the methods and systems described herein, the server 2 may further be configured to incorporate a third visual identifier 24 within redeemed electronic tickets (to indicate that the ticket has been redeemed and may no longer be used). In addition, the invention provides that after an electronic ticket has been redeemed, the electronic ticket may show the date and time at which the ticket was validated. Still further, the invention provides that the electronic ticket may be automatically deleted from each user device 10, after a defined period of time following the applicable event.

Figure 5:
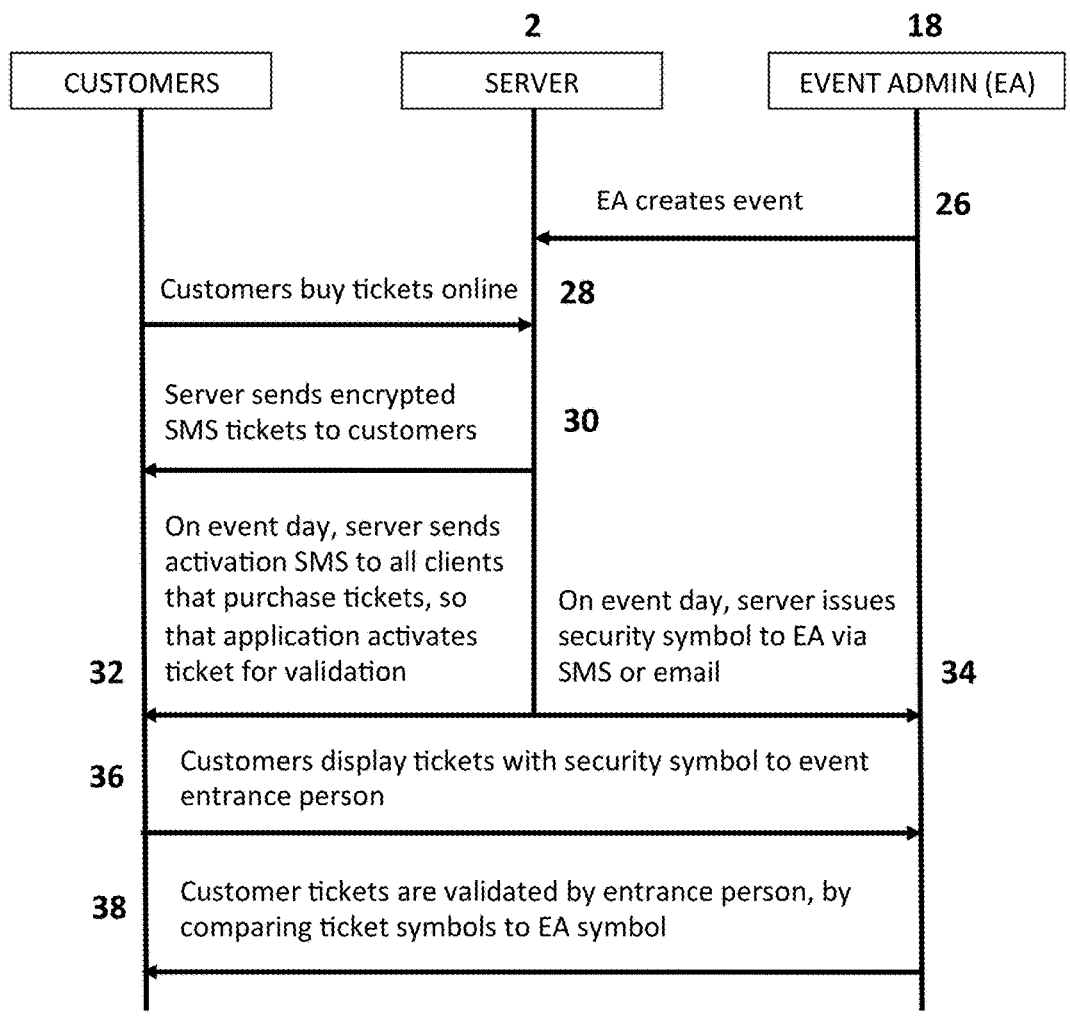
FIG. 5 is a diagram that illustrates the flow of information and data among users of the systems described herein, the server of the systems, and the event/venue administrators.
Figure 6:
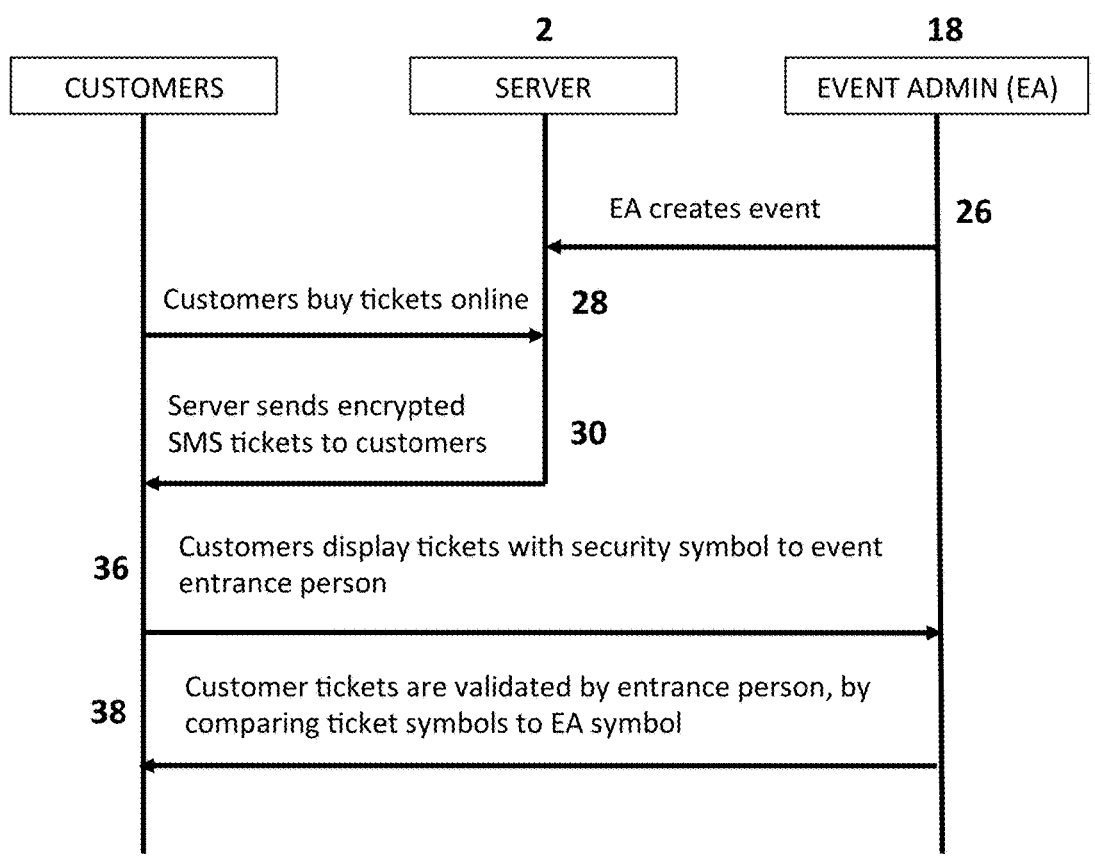
FIG. 6 is a diagram that illustrates another means (a more streamlined means) by which information and data flow among users of the systems described herein, the server of the systems, and the event/venue administrators.

FIG. 5 provides a summary of the information and data flow described herein. Referring to FIG. 5, the process described herein may begin with an event administrator 18 creating an event 26 through the centralized website 6. Next, customers (attendees of the event) may purchase electronic tickets online 28, at which time the server 2 issues electronic tickets with embedded encrypted visual identifiers 14 to such customers via SMS communications 30. On the day of the event, the server 2 issues an activation SMS communication to the user devices 10 of all users who hold an electronic ticket for a particular event, which (along with the computer application 8 housed in the device 10) is effective to activate and render the ticket eligible for validation 32. In addition, the server 2 issues a SMS communication (or email) 34 to the event administrator 18 that identifies the decrypted form 20 of the visual identifier for the particular event (and, for example, the PIN number that may be used to decrypt the visual identifier). The customers may then display their devices 10 and electronic tickets—which include the encrypted visual identifiers 14—to an event entrance doorperson 36. The customer tickets are then validated 38 by the entrance doorperson entering the assigned PIN number and comparing the resulting decrypted form 20 of each visual identifier shown in each customer's ticket to the symbol that was previously communicated to the event administrator 18. FIG. 6 provides another non-limiting (and more streamlined) example of the means by which information and data flow using the system described herein.

According to yet further embodiments of the present invention, the server 2 is further configured to receive, and store within a database 4, ticket issuance and validation data. The ticket issuance and validation data may include (i) a number of electronic tickets that have been issued for an event; (ii) an identifier (e.g., name, email address, telephone number, username, etc.) that is correlated to each user who has been issued an electronic ticket for an event; (iii) a number of users who have redeemed electronic tickets for an event at any given time (so that event attendance may be monitored in real-time); (iv) an identifier that is correlated to each user who has redeemed an electronic ticket for an event; or (v) combinations of the foregoing.

According to yet further embodiments of the invention, the server 2 and computer application 8 may be configured to embed a second validation symbol in each electronic ticket. The second validation symbol may also be encrypted, and only decrypted through a manual gesture (e.g., PIN number entry) applied to a user's device 10. The invention provides that the second validation symbol may be utilized, if necessary, to further validate the authenticity of an electronic ticket; serve as a back-up means for validating an electronic ticket, if the first encrypted visual identifier 14 is insufficient for unexpected reasons; or other purposes.

The many aspects and benefits of the invention are apparent from the detailed description, and thus, it is intended for the following claims to cover all such aspects and benefits of the invention that fall within the scope and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. A system for generating, distributing, and validating an electronic ticket for an event, which comprises a server that includes a central processor and memory, wherein the server is configured to host a centralized website through which a computer application is downloaded into a plurality of user devices, wherein the server is further configured to:

(a) at the request of system users, issue electronic tickets to the user devices that have downloaded the computer application, wherein each electronic ticket is subsequently stored within each user's device;

(b) include an encrypted visual symbol that is unique to an event in each electronic ticket that is stored within each user's device;

(c) generate instructions that are issued to an event administrator that identifies a decrypted form of the visual symbol for each event; and (d) include instructions within each electronic ticket that are executed by an event administrator to convert the encrypted visual symbol that is shown in the electronic ticket of each user device into the decrypted form of the visual symbol, wherein:

(i) the server is configured to permit the encrypted visual symbol that is shown in each electronic ticket of each user device to convert into the decrypted form of the visual symbol only during a prescribed period of time;

(ii) the decrypted form of the visual symbol is viewable within a graphical user interface of each user device;

(iii) the electronic tickets are issued to the user devices via short message service (SMS) communications, electronic mail, or download through a website;

(iv) the instructions that identify the decrypted form of the visual symbol for each event are issued to the event administrator via short message service (SMS) communications, electronic mail, or download through a website;

(v) the instructions that identify the decrypted form of the visual symbol for each event include an identification of the visual symbol that appears when the encrypted visual identifier is converted into the decrypted form and a description of a set of actions that an event administrator must perform with each user device, which is effective to convert the encrypted visual symbol into the decrypted form, wherein the set of actions comprise (x) a touch pattern to apply to a touch screen of each user device; (y) a numeric code to enter into a keypad included within each user device; or (z) a method for holding and orienting each user device which is detected by an accelerometer included within each user device; and (vi) the server is configured to incorporate a third visual symbol within redeemed electronic tickets.

2. The system of claim 1, wherein the server is further configured to receive, and store within a database, ticket issuance and validation data.

3. The system of claim 2, wherein the ticket issuance and validation data comprise:

(a) a number of electronic tickets that have been issued for an event;

(b) an identifier that is correlated to each user who has been issued an electronic ticket for an event;

(c) a number of users who have redeemed electronic tickets for an event; or (d) an identifier that is correlated to each user who has redeemed an electronic ticket for an event.

4. The system of claim 3, wherein the prescribed period of time during which the encrypted visual symbol that is shown in each electronic ticket is converted into the decrypted form of the visual symbol comprises date and time coordinates that are specified by the event administrator through the centralized website.

* * * * *